United States Patent
Tsuda

(10) Patent No.: US 10,356,827 B2
(45) Date of Patent: Jul. 16, 2019

(54) APPARATUS, METHOD, AND PROGRAM

(71) Applicant: SONY CORPORATION, Tokyo (JP)

(72) Inventor: Shinichiro Tsuda, Kanagawa (JP)

(73) Assignee: SONY CORPORATION, Tokyo (JP)

(*) Notice: Subject to any disclaimer, the term of this patent is extended or adjusted under 35 U.S.C. 154(b) by 197 days.

(21) Appl. No.: 15/317,962

(22) PCT Filed: May 1, 2015

(86) PCT No.: PCT/JP2015/063133
§ 371 (c)(1),
(2) Date: Dec. 11, 2016

(87) PCT Pub. No.: WO2016/002332
PCT Pub. Date: Jan. 7, 2016

(65) Prior Publication Data
US 2017/0127456 A1 May 4, 2017

(30) Foreign Application Priority Data
Jun. 30, 2014 (JP) ................................. 2014-134663

(51) Int. Cl.
*H04W 76/10* (2018.01)
*H04W 88/04* (2009.01)
(Continued)

(52) U.S. Cl.
CPC ............... *H04W 76/10* (2018.02); *H04L 5/14* (2013.01); *H04W 72/042* (2013.01);
(Continued)

(58) Field of Classification Search
None
See application file for complete search history.

(56) References Cited

U.S. PATENT DOCUMENTS

2010/0254295 A1* 10/2010 Ahn ................... H04N 21/2383
370/312
2011/0013571 A1* 1/2011 Sawai ................... H04W 16/14
370/329
(Continued)

FOREIGN PATENT DOCUMENTS

JP 2009-504048 A 1/2009
JP 2009-055454 A 3/2009
(Continued)

OTHER PUBLICATIONS

"Evolved Universal Terrestrial Radio Access (E-UTRA) and Evolved Universal Terrestrial Radio Access Network (E-UTRAN); Overall description; Stage 2", The Mobile Broadband Standard, 3GPP TS 36.300 version 12.1.0 Release 12, Mar. 2014, 8 pages.
(Continued)

Primary Examiner — Chi H Pham
Assistant Examiner — Raul Rivas
(74) Attorney, Agent, or Firm — Xsensus, LLP

(57) ABSTRACT

[Object] To make it possible to reduce the amount of wireless resources that is necessary for the wireless backhaul for a wireless communication device operating as a base station. [Solution] There is provided an apparatus including: a controller configured to control an operation of a wireless communication device so that the wireless communication device performs an operation as a mobile station performing wireless communication with a base station. The controller controls an operation of the wireless communication device so that the wireless communication device performs an operation as a base station performing wireless communication with a mobile station and an operation as a core network node.

17 Claims, 8 Drawing Sheets

(51) Int. Cl.
H04W 92/14 (2009.01)
H04L 5/14 (2006.01)
H04W 72/04 (2009.01)

(52) U.S. Cl.
CPC ....... H04W 72/0453 (2013.01); H04W 88/04 (2013.01); H04W 92/14 (2013.01)

(56) References Cited

U.S. PATENT DOCUMENTS

| | | | |
|---|---|---|---|
| 2014/0169279 A1* | 6/2014 | Song | H04W 72/082 370/329 |
| 2015/0045049 A1* | 2/2015 | Sawai | H04W 52/244 455/452.1 |
| 2015/0215879 A1* | 7/2015 | Zhu | H04W 56/0015 370/350 |

FOREIGN PATENT DOCUMENTS

| | | |
|---|---|---|
| JP | 2010-233184 A | 10/2010 |
| JP | 2013-511935 A | 4/2013 |
| JP | 2013-098950 A | 5/2013 |
| WO | 2014/034255 A1 | 3/2014 |

OTHER PUBLICATIONS

"Evolved Universal Terrestrial Radio Access (E-UTRA) and Evolved Universal Terrestrial Radio Access Network (E-UTRAN)", Overall description; Stage 2, 3rd Generation Partnership Project; Technical Specification Group Radio Access Network, 3GPP TS 36.300, V12.1.0, Mar. 2014, 08 pages.

* cited by examiner

FIG. 4

| #0 D | #1 S | #2 U | #3 U | #4 D | #5 D | #6 S | #7 U | #8 U | #9 D |

APPARATUS, METHOD, AND PROGRAM

CROSS REFERENCE TO RELATED APPLICATIONS

This application is a U.S. National Phase of International Patent Application No. PCT/JP2015/063133 filed on May 1, 2015, which claims priority benefit of Japanese Patent Application No. JP 2014-134663 filed in the Japan Patent Office on Jun. 30, 2014. Each of the above-referenced applications is hereby incorporated herein by reference in its entirety.

TECHNICAL FIELD

The present disclosure relates to an apparatus, a method, and a program.

BACKGROUND ART

In 2002, the mobile phone service of the 3G system, which is called the third generation in Japan, started. At first, small-size packets were transmitted and received for voice calls and mail transmission. However, with the introduction of high speed downlink packet access (HSDPA), it became possible to transmit and receive larger-size packets for downloading of music files or streaming of video. With such an increase of packet capacities, the service of long term evolution (LTE) in which orthogonal frequency division multiple access (OFDMA) is used on the downlink also started for the expansion on the side of the wireless network. In addition, the 4G service is scheduled to be started in around 2015. Accordingly, up to 1 Gbps (bit per second) is achieved in a semi-fixed environment and up to 100 Mbps is achieved even in a mobile environment.

With such increase in network traffic, it is desirable that a small base station that is inexpensive and easy to install is provided, thereby preventing the concentration of traffic. Various techniques are developed for such a small cell.

As one example, Patent Literature 1 discloses the technique for selecting a device that operates as an access point for a mobile station based on the quality obtained by measuring a wireless signal transmitted from one or more terminal devices.

CITATION LIST

Patent Literature

Patent Literature 1: WO2014/034255

SUMMARY OF INVENTION

Technical Problem

However, the technique disclosed in Patent Literature 1 employs the wireless backhaul for communication between a terminal device operating as a base station (access point) and a core network node, and so a large amount of wireless resources can be consumed by the wireless backhaul.

Thus, it is preferable to provide a mechanism capable of reducing the amount of wireless resources that is necessary for the wireless backhaul for a wireless communication device operating as a base station.

Solution to Problem

According to the present disclosure, there is provided an apparatus including: a controller configured to control an operation of a wireless communication device so that the wireless communication device performs an operation as a mobile station performing wireless communication with a base station. The controller controls an operation of the wireless communication device so that the wireless communication device performs an operation as a base station performing wireless communication with a mobile station and an operation as a core network node.

According to the present disclosure, there is provided a method including: controlling, by a processor, an operation of a wireless communication device so that the wireless communication device performs an operation as a mobile station performing wireless communication with a base station; and controlling, by the processor, an operation of the wireless communication device so that the wireless communication device performs an operation as a base station performing wireless communication with a mobile station and an operation as a core network node.

According to the present disclosure, there is provided a program for causing a processor to execute: controlling an operation of a wireless communication device so that the wireless communication device performs an operation as a mobile station performing wireless communication with a base station; and controlling an operation of the wireless communication device so that the wireless communication device performs an operation as a base station performing wireless communication with a mobile station and an operation as a core network node.

Advantageous Effects of Invention

According to the present disclosure as described above, it is possible to reduce the amount of wireless resources that is necessary for the wireless backhaul for a wireless communication device operating as a base station. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 4 is a diagram illustrated to describe an example of a downlink sub-frame and an uplink sub-frame.

DESCRIPTION OF EMBODIMENT(S)

Figure 1:
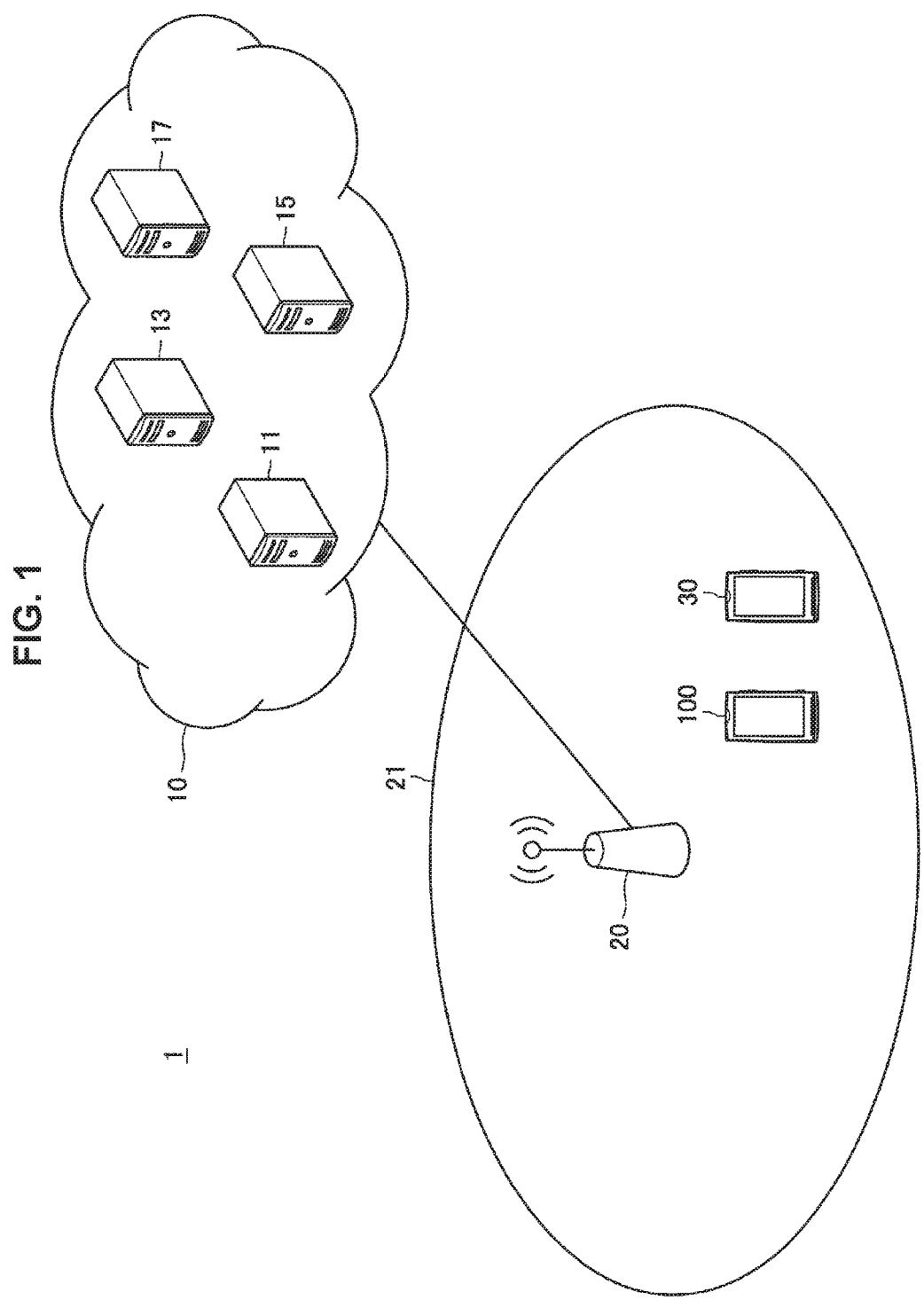
FIG. 1 is a diagram illustrated to describe an example of a schematic configuration of a communication system according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

The description will be given in the following order.
1. Schematic configuration of communication system
2. Configuration of Wireless Communication Device
3. Processing Procedure
4. Application Examples
5. Conclusion 1. Configuration of Communication System A schematic configuration of a communication system 1 according to one embodiment of the present disclosure is now described with reference to FIG. 1. FIG. 1 is a diagram illustrated to describe an example of the schematic configuration of the communication system 1 according to one embodiment of the present disclosure. Referring to FIG. 1, the communication system 1 includes a core network (CN) node of a core network 10, a base station 20, a mobile station 30, and a wireless communication device 100. As one example, the communication system 1 is a system based on LTE, LTE-Advance, or its equivalent communication standard.

(CN 10)

The CN 10 includes, as a CN node, a control entity 11, a subscriber information database 13, a first gateway 15, and a second gateway 17.

The control entity 11 is responsible for control plane functionality. As one example, the control entity 11 is a mobility management entity (MME).

The subscriber information database 13 stores subscriber-related information. As one example, the subscriber information database 13 is a home subscriber server (HSS).

The first gateway 15 is a gateway that is responsible for user plane functionality. As one example, the first gateway 15 is a serving gateway (S-GW).

The second gateway 17 is a gateway that is used to connect with an external network. As one example, the second gateway 17 is a packet data network (PDN) gateway (P-GW).

The CN 10 may further include another core network node. The CN 10 may include an entity that is responsible for the charging function (e.g. policy and charging rule function (PCRF), a database that stores identification information of equipment (e.g. equipment identity register (ER)), or the like.

(Base Station 20)

The base station 20 performs wireless communication with a mobile station. As one example, the base station 20 performs wireless communication with a mobile station located in a cell 21 that is a communication area of the base station 20. More specifically, as one example, the base station 20 performs wireless communication with a mobile station 30. As one example, when the wireless communication device 100 operates as a mobile station, the base station 20 performs wireless communication with the wireless communication device 100. As one example, the base station 20 is an evolved node B (eNB).

(Mobile Station 30)

The mobile station 30 performs wireless communication with a base station. As one example, when the mobile station 30 is located in a cell that is a communication area of a base station, the mobile station 30 performs wireless communication with the base station. More specifically, as one example, when the mobile station 30 is located in the cell 21, the mobile station 30 performs wireless communication with the base station 20. As one example, when the wireless communication device 100 operates as a base station, the mobile station 30 performs wireless communication with the wireless communication device 100. As one example, the mobile station 30 is user equipment (UE).

(Wireless Communication Device 100)

The wireless communication device 100 can operate as a mobile station that performs wireless communication with a base station. As one example, when the wireless communication device 100 operates as a mobile station and is located in a cell that is a communication area of a base station, the wireless communication device 100 performs wireless communication with the base station. More specifically, as one example, when the wireless communication device 100 is located in the cell 21, the wireless communication device 100 performs wireless communication with the base station 20.

The wireless communication device 100 can also operate as a base station that performs wireless communication with a mobile station. As one example, the wireless communication device 100 performs wireless communication with a mobile station that is located in a communication area of the wireless communication device 100. More specifically, as one example, wireless communication device 100 performs wireless communication with the mobile station 30. When the wireless communication device 100 operates as a base station, the wireless communication device 100 communicates with a CN node through a wireless backhaul.

More particularly, in the embodiment of the present disclosure, the wireless communication device 100 can operate as a base station and a CN node. This makes it possible, as one example, to reduce the amount of wireless resources necessary for a wireless backhaul for the wireless communication device 100 that operates as a base station.

2. Configuration of Wireless Communication Device

Figure 2:
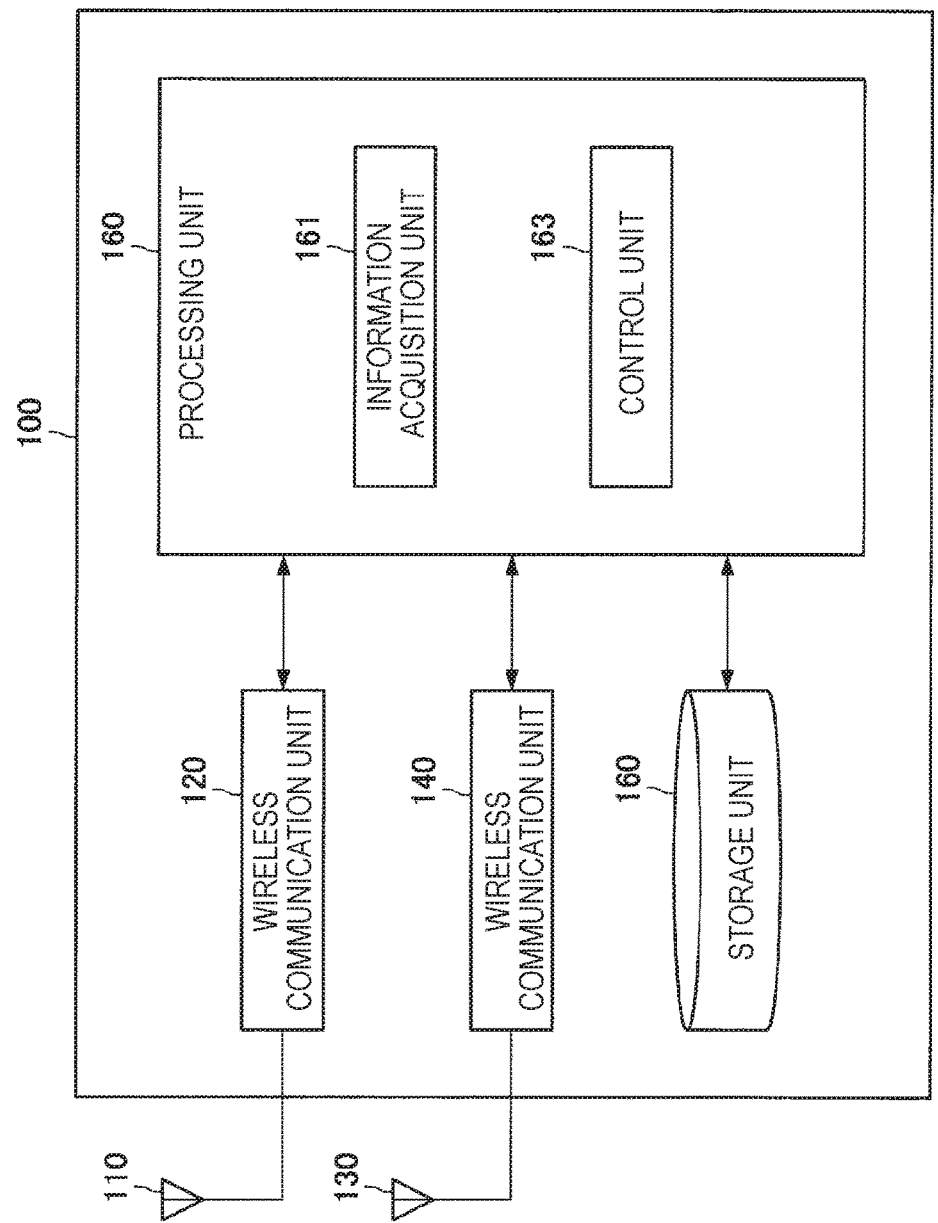
FIG. 2 is a block diagram an exemplary configuration of a wireless communication device 100 according to the present embodiment.

An exemplary configuration of the wireless communication device 100 according to an embodiment of the present disclosure is now described with reference to FIGS. 2 to 5. FIG. 2 is a block diagram an exemplary configuration of the wireless communication device 100 according to the embodiment of the present disclosure. Referring to FIG. 2, the wireless communication device 100 is configured to include a first antenna unit 110, a first wireless communication unit 120, a second antenna unit 130, a second wireless communication unit 140, a storage unit 150, and a processing unit 160.

(First Antenna Unit 110)

The first antenna unit 110 radiates a signal outputted by the first wireless communication unit 120 into space as a radio wave. The first antenna unit 110 converts a radio wave in space to a signal and outputs the signal to the first wireless communication unit 120.

(First Wireless Communication Unit 120)

The first wireless communication unit 120 transmits and receives a signal.

As one example, when the wireless communication device 100 operates as a mobile station, the first wireless communication unit 120 receives a downlink signal from a base station (e.g. the base station 20) and transmits an uplink signal to a base station (e.g. the base station 20).

As one example, when the wireless communication device 100 operates as a base station, the first wireless communication unit 120 transmits a downlink signal to a mobile station (e.g. the mobile station 30) and receives an uplink signal from a mobile station (e.g. the mobile station 30).

(Second Antenna Unit 130)

The second antenna unit 130 radiates a signal outputted by the second wireless communication unit 140 into space as a radio wave. The second antenna unit 130 converts a radio wave in space to a signal and outputs the signal to the second wireless communication unit 140.

(Second Wireless Communication Unit 140)

The second wireless communication unit 120 transmits and receives a signal. The second wireless communication unit 140 is a wireless communication unit for the wireless backhaul.

As one example, when the wireless communication device 100 operates as a base station, the first wireless communication unit 120 transmits a signal to a corresponding base station (e.g. the base station 20) for the wireless backhaul and receives a signal from the corresponding base station.

(Storage Unit 150)

The storage unit 150 stores a program and data used for the operation of the wireless communication device 100 on a temporary or permanent basis.

(Processing Unit 160)

The processing unit 160 enables the wireless communication device 100 to perform various functions. The processing unit 160 is configured to include an information acquisition unit 161 and a control unit 163. The processing unit 160 may further include a component other than these components. In other words, the processing unit 160 may also perform an operation other than operations of these components.

(Information Acquisition Unit 161)

The information acquisition unit 161 acquires information used for a control by the control unit 163. An example of the information will be described in conjunction with the control by the control unit 163.

(Control Unit 163)

The control unit 163 controls an operation of the wireless communication device 100.

More particularly, in the embodiment of the present disclosure, the control unit 163 controls an operation of the wireless communication device 100 so that the wireless communication device 100 performs an operation as a mobile station (referred to as "mobile station operation" hereinafter) that performs wireless communication with a base station. The control unit 163 controls an operation of the wireless communication device 100 so that the wireless communication device 100 performs an operation as a base station (referred to as "base station operation" hereinafter) that performs wireless communication with a mobile station and an operation as a CN node (referred to as "CN node operation" hereinafter).

(a) Operations (a-1) Mobile Station Operation

Example of Mobile Station Operation

As one example, the mobile station operation includes receiving a downlink signal. The downlink signal includes a downlink data signal and/or control signal.

As one example, the control signal includes a synchronization signal and a reference signal. An example of the reference signal includes a cell-specific reference signal (CRS), a demodulation reference signal (DM-RS), a channel state information reference signal (CSI-RS), and/or multimedia broadcast multicast service (MBMS) over single frequency network reference signal (MBSFN-RS). An example of the control signal includes a system information signal and a paging signal.

As one example, the mobile station operation includes transmitting an uplink signal. The uplink signal includes an uplink data signal and/or control signal.

Case of FDD

As one example, the mobile station operation includes receiving a downlink signal using a downlink band in frequency division duplex (FDD) and transmitting an uplink signal using an uplink band in FDD. In this regard, more detailed description will be given with reference to FIG. 3.

Figure 3:
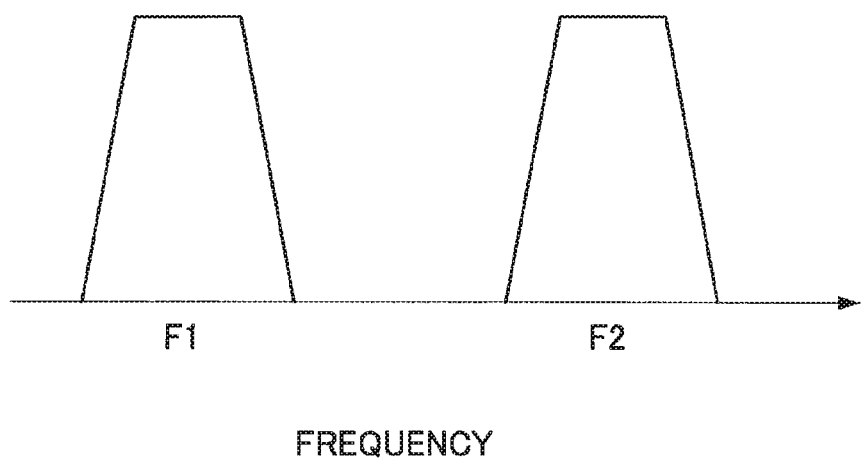
FIG. 3 is a diagram illustrated to describe an example of an uplink band and a downlink band.

FIG. 3 is a diagram illustrated to describe an example of an uplink band and a downlink band. Referring to FIG. 3, an uplink band F1 and a downlink band F2 are illustrated. As one example, the wireless communication device 100 receives a downlink signal using the downlink bank F2 and transmits an uplink signal using the uplink band F1, as the mobile station operation.

Case of TDD

The mobile station operation may include receiving a downlink signal in a downlink sub-frame in time division duplex (TDD) and transmitting an uplink signal in an uplink sub-frame in TDD. In this regard, more detailed description will be given with reference to FIG. 4.

Figure 4:
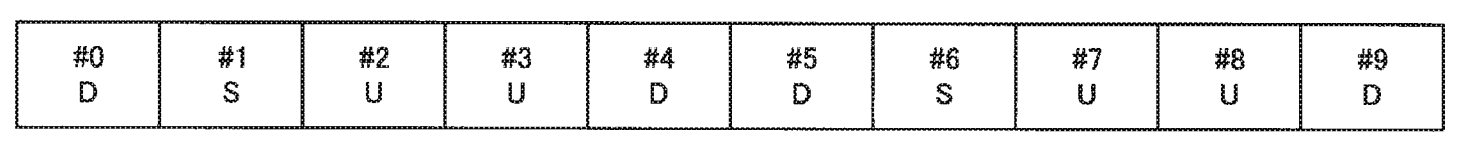

FIG. 4 is a diagram illustrated to describe an example of a downlink sub-frame and an uplink sub-frame. Referring to FIG. 4, uplink/downlink configuration is illustrated. In other words, there is illustrated a wireless frame that contains ten sub-frames, each of them is one of a downlink sub-frame, an uplink sub-frame, and a special sub-frame. As one example, the wireless communication device 100 receives a downlink signal in downlink sub-frames numbered 0, 4, 5, and 9, as the mobile station operation described above. The wireless communication device 100 transmits an uplink signal in uplink sub-frames numbered 2, 3, and 7, as the mobile station operation described above. The wireless communication device 100 receives a downlink signal using a downlink pilot time slot (DwPTS) of special sub-frames numbered 1 and 6, as the mobile station operation described above. The wireless communication device 100 transmits an uplink signal using an uplink pilot time slot (UpPTS) of special sub-frames numbered 1 and 6, as the mobile station operation described above.

Other Operations

The mobile station operation certainly includes other operations. As one example, the mobile station operation includes measurement on a cell.

Example of Control

In one example, the control unit 163 sets the operation mode of the wireless communication device 100 to a first mode for allowing it to operate as a mobile station, as a control for causing the wireless communication device 100 to perform the mobile station operation. The setting of the operation mode may include switching of programs and switching of modules having program. Thus, as one example, in the wireless communication device 100, a program for the mobile station operation is executed, and the wireless communication device 100 performs the mobile station operation. The program may be stored previously in the wireless communication device 100 or may be provided as appropriate by the base station 20 or the CN node.

The control unit 163 may perform other processes, as a control for causing the wireless communication device 100 to perform the mobile station operation, in addition to the setting of the operation mode or in place of the setting of the operation mode.

As one example, the control unit 163 may perform a process for the mobile station operation. As one example, the control unit 163 may acquire scheduling information transmitted by a base station. An example of the scheduling information may include downlink resource allocation information and uplink resource allocation information. The control unit 163 may perform a process for receiving a downlink signal that is transmitted using an allocated downlink resource based on the downlink resource allocation information. The control unit 163 may perform a process for transmitting an uplink signal that is transmitted using an allocated uplink resource based on the uplink resource allocation information.

(a-2) Base Station Operation

Example of Base Station Operation

As one example, the base station operation includes transmitting a downlink signal. The downlink signal includes a downlink data signal and/or control signal.

As one example, the control signal includes a synchronization signal and a reference signal. An example of the reference signal includes a CRS, a DM-RS, a CSI-RS, and/or MBSFN-RS. This makes it possible, as one example, for a mobile station to be synchronized with the wireless communication device 100 and to perform measurement on the wireless communication device 100. An example of the control signal includes a system information signal, a paging signal, or the like.

As one example, the base station operation includes receiving an uplink signal. The uplink signal includes an uplink data signal and/or control signal.

Case of FDD

As described above, as one example, in FDD, the mobile station operation includes receiving a downlink signal using a downlink band and transmitting an uplink signal using an uplink band.

First Example (FDD-FDD)

As a first example, in FDD, the base station operation includes transmitting a downlink signal using the downlink band and receiving an uplink signal using the uplink band.

Referring again to FIG. 3, as described above, the wireless communication device 100 receives a downlink signal using the downlink band F2 and transmits an uplink signal using the uplink band F1, as the mobile station operation. On the other hand, the wireless communication device 100 transmits a downlink signal using the downlink band F2 and receives an uplink signal using the uplink band F1, as the base station operation.

This makes it possible for a mobile station to perform wireless communication with the wireless communication device 100 that operates as a base station, which is similar to performing wireless communication with a base station.

Second Example (FDD-TDD)

As a second example, in TDD, the base station operation includes transmitting a downlink signal in a downlink sub-frame and receiving an uplink signal in an uplink sub-frame, using the downlink band or the uplink band.

Referring again to FIG. 3, as described above, the wireless communication device 100 receives a downlink signal using the downlink band F2 and transmits an uplink signal using the uplink band F1, as the mobile station operation. On the other hand, the wireless communication device 100 may transmit a downlink signal in a downlink sub-frame and may receive an uplink signal in an uplink sub-frame, using the downlink band F2 or the uplink band F1 (e.g. as illustrated in FIG. 4), as the base station operation. The wireless communication device 100 may transmit a downlink signal in the DwPTS of the special sub-frames and may receive an uplink signal in the UpPTS of the special sub-frames, as the base station operation.

The makes it possible, as one example, for a mobile station operating in TDD to perform wireless communication with the wireless communication device 100.

The base station operation may include, in TDD, transmitting a downlink signal in a downlink sub-frame and receiving an uplink signal in an uplink sub-frame, using both the downlink band and the uplink band through carrier aggregation.

Referring again to FIG. 3, as described above, the wireless communication device 100 may transmit a downlink signal in a downlink sub-frame and receive an uplink signal in an uplink sub-frame, using both the downlink band F2 and the uplink band F1 (e.g. as illustrated in FIG. 4) through carrier aggregation, as the base station operation. The wireless communication device 100 may transmit a downlink signal in the DwPTS of the special sub-frames and may receive an uplink signal in the UpPTS of the special sub-frames, as the base station operation. Different uplink/downlink configurations may be applied between the downlink band F2 and the uplink band F1.

This makes it possible, as one example, for a mobile station operating in TDD to perform wireless communication with the wireless communication device 100 at high speed.

Case of TDD

As described above, the mobile station operation may include receiving a downlink signal in a downlink sub-frame and transmitting an uplink signal in an uplink sub-frame, in time division duplex (TDD). In this case, in TDD, the base station operation may include transmitting a downlink signal in a downlink sub-frame and receiving an uplink signal in an uplink sub-frame.

Referring again to FIG. 4, the wireless communication device 100 may receive a downlink signal in the downlink sub-frames numbered 0, 4, 5, and 9 and the DwPTS of the special sub-frames numbered 1 and 6, as the mobile station operation. The wireless communication device 100 may transmit an uplink signal in the uplink sub-frames numbered 2, 3, and 7 and the UpPTS of the special sub-frames numbered 1 and 6, as the mobile station operation. On the other hand, the wireless communication device 100 may transmit a downlink signal in the downlink sub-frames numbered 0, 4, 5, and 9 and the DwPTS of the special sub-frames numbered 1 and 6, as the base station operation. The wireless communication device 100 may receive an uplink signal in the uplink sub-frames numbered 2, 3, and 7 and the UpPTS of the special sub-frames numbered 1 and 6, as the base station operation.

This makes it possible, as one example, for a mobile station to perform wireless communication with the wireless communication device 100 that operates as a base station, which is similar to performing wireless communication with a base station.

Other Operations

The base station operation certainly includes other operations. As one example, the base station operation includes a radio resource control (RRC) protocol operation (e.g. control of RRC connection and control of quality of service (QoS)) or the like.

Frequency Band Used by Wireless Communication Device 100

First Example

As described above, in one example, the wireless communication device 100, when operating as a base station, performs wireless communication with a mobile station using a frequency band used for wireless communication between a normal base station and a mobile station (i.e., a frequency band that can be used when the wireless communication device 100 operates as a mobile station). In this case, the wireless communication device 100 uses a frequency band in which the interference to wireless communication in a normal base station (e.g. the base station 20) is avoided or prevented. As one example, only when a normal base station (e.g. the base station 20) does not use a frequency band, the wireless communication device 100 is permitted to use the frequency band. As another example, even when a normal base station (e.g. the base station 20) uses a frequency band, the use of interference control technique allows the wireless communication device 100 to use the frequency band. As one example, the frequency band is a component carrier.

Second Example

The wireless communication device 100, when operating as a base station, may use another frequency band that is different from the frequency band used for wireless communication between a normal base station and a mobile station (i.e., the frequency band that can be used when the wireless communication device 100 operates as a mobile station).

The other frequency band may be a frequency band included in a licensed band of the communication system 1 or may be a frequency band included in an unlicensed band.

The other frequency band may be a frequency band that is shared among a plurality of wireless communication systems and is permitted to be used. When the frequency band that is shared among a plurality of wireless communication systems is permitted to be used based on the position of a device, the wireless communication device 100 may provide position information that indicates the position of the wireless communication device 100. The position information may be position information from a global positioning system (GPS) or may be position information obtained by another positioning technique (as one example, positioning technique based on the reception power of a signal transmitted by a base station or access point). The other frequency band may be a frequency band of television white space (TVWS), spectrum access system (SAS), or the like.

The other frequency band (e.g. frequency band permitted to be used) may be a component carrier. Furthermore, the other frequency band may be used only as a secondary component carrier (SCC) of the carrier aggregation.

Notification

As one example, the frequency band, which is used by the wireless communication device 100 operating as a base station to perform wireless communication with a mobile station, is notified to the wireless communication device 100 by the base station 20 or a core network node (e.g. the control entity 11). The control unit 163 controls the operation of the wireless communication device 100 so that the wireless communication device 100 may perform wireless communication with a mobile station using the frequency band notified to the wireless communication device 100.

As one example, the base station 20 or the core network node transmits frequency band information indicating the frequency band to the wireless communication device 100, and the information acquisition unit 161 acquires the frequency band information. The control unit 163 sets the frequency band to a frequency band for the wireless communication with a mobile station. This allows the first wireless communication unit 120 to use the frequency band, as one example.

Example of Control

As one example, the control unit 163 sets the operation mode of the wireless communication device 100 to a second mode for allowing it to operate as a base station and a CN node, as a control for causing the wireless communication device 100 to perform the base station operation. The setting of the operation mode may include switching of programs and switching of modules having program. Thus, as one example, in the wireless communication device 100, a program for the base station operation is executed, and the wireless communication device 100 performs the base station operation. The program may be stored previously in the wireless communication device 100 or may be provided as appropriate by the base station 20 or the CN node.

The control unit 163 may perform other processes, as a control for causing the wireless communication device 100 to perform the base station operation, in addition to the setting of the operation mode or in place of the setting of the operation mode.

As one example, the control unit 163 may perform a process for the base station operation. As one example, the control unit 163 may perform scheduling. In other words, the control unit 163 may perform downlink resource allocation and uplink resource allocation. As another example, the control unit 163 may perform a control for transmission of scheduling information (e.g. mapping of a signal for the scheduling information to a wireless resource of physical downlink control channel (PDCCH)). As yet another example, the control unit 163 may perform a process for transmitting a downlink signal that is transmitted using the allocated downlink resource based on the downlink resource allocation information. As still another example, the control unit 163 may perform a process for receiving an uplink signal that is transmitted using the allocated uplink resource based on the uplink resource allocation information.

As one example, the control unit 163 may set a frequency band to be used when it operates as a base station, as a control for causing the wireless communication device 100 to perform the base station operation. More specifically, as one example, the base station 20 or the core network node transmits frequency band information indicating the frequency band to the wireless communication device 100, and the information acquisition unit 161 acquires the frequency band information, as described above. The control unit 163 may set the frequency band to a frequency band for the wireless communication with a mobile station, as a control for causing the wireless communication device 100 to perform the base station operation. The control unit 163 may set the maximum transmission power for the frequency band in conjunction with the setting of the frequency band. The maximum transmission power may be indicated by the frequency band information.

(a-3) CN Node Operation

As described above, the control unit 163 controls the operation of the wireless communication device 100 so that the wireless communication device 100 may perform the base station operation (i.e., operation as a base station) and the CN node operation (i.e., operation as a CN node).

Example of CN Node Operation

Control Entity

As one example, the CN node includes a control entity that is responsible for the control plane functionality. As one example, the control entity is a mobility management entity (MME). The control entity may be a multi-cell/multicast coordination (MC) entity (MCE).

As one example, the CN node operation includes performing an attach procedure as the control entity. The attach procedure is a procedure for registering a mobile station with a network. More specifically, as one example, the attach procedure includes identification of a mobile station, authentication of a mobile station, and/or security mode control procedure, upon an attach request from a mobile station. The attach procedure includes notification of attach complete to a mobile station (e.g. transmission of an attach complete message) and notification of attach reject to a mobile station (e.g. transmission of an attach reject message).

As one example, the CN node operation includes performing a procedure for bearer establishment. More specifically, as one example, the procedure for bearer establishment includes a bearer context activation request (e.g. transmission of a bearer context activation request message). The bearer establishment may be default bearer establishment, or may be dedicated bearer establishment. The default bearer establishment procedure may be included in the attach procedure.

The wireless communication device 100 can perform the operation as the control entity (e.g. MME), thereby reducing the amount of wireless resources that are necessary for the wireless backhaul, as one example. More specifically, as one example, the transmission and reception of a message between a base station and the control entity are performed in the wireless communication device 100, and thus the signal to be transmitted by the wireless backhaul decreases, thereby reducing the amount of wireless resources. The delay of bearer establishment due to the wireless backhaul can be prevented.

The wireless communication device 100 can perform the operation as the control entity (e.g. MME), and thus it is possible to prevent the increase in the load on the control entity 11 (e.g. MME) installed in the core network 10. More specifically, as one example, as the number of wireless communication devices operating as a base station increases, the number of base stations to be managed by the control entity 11 commonly increases, resulting in an increase in the load on the control entity 11. However, as described above, when both the base station and the control entity are equipped in the wireless communication device, it is possible to prevent an increase in the load on the control entity 11 even if the number of wireless communication devices operating as a base station dynamically increases.

Gateway

As one example, the CN node includes a gateway that is responsible for the user plane function. As one example, the gateway is a serving gateway (S-GW). The gateway may be multimedia broadcast/multicast service gateway (MBMS-GW).

As one example, the CN node operation includes performing a procedure for bearer establishment as the gateway. More specifically, the procedure for bearer establishment includes providing the control entity (e.g. MME) with bearer-related information (e.g. allocated IP address). The bearer establishment may be default bearer establishment or may be dedicated bearer establishment.

The wireless communication device 100 can perform the operation as the gateway (e.g. S-GW), thereby reducing the amount of wireless resources that are necessary for the wireless backhaul, as one example. More specifically, as one example, the transmission and reception of a message between the control entity (e.g. MME) and the gateway (e.g. S-GW) are performed in the wireless communication device 100, and thus the signal to be transmitted by the wireless backhaul decreases, resulting in a reduction in the amount of wireless resources. The delay of bearer establishment due to the wireless backhaul can be prevented.

The CN node operation may include performing a control of packet transfer in accordance with a policy as the gateway. The policy may be a policy provided by the PCRF, as one example. Furthermore, the control unit 163 may control the operation of the wireless communication device 100 so that the wireless communication device 100 may perform an operation as the PCRF.

This makes it possible, as one example, for the wireless communication device 100 to introduce a unique charging system (e.g. refunding a part of the communication fee on a mobile station to the wireless communication device 100 performing the base station operation, or providing a discount of communication fee on the wireless communication device 100 performing the base station operation). A unique QoS control can be performed in the wireless communication device 100.

Interface Between Operations

As described above, as one example, the wireless communication device 100 performs the operation as a base station, the operation as the control entity, and/or the operation as the gateway. In other words, the wireless communication device 100 is equipped with the function of a base station, the function of the control entity, and/or the function of the gateway. More specifically, as one example, the wireless communication device 100 is equipped with the function of eNB, the function of MME, and/or the function of S-GW.

As one example, an interface between the function of eNB and the function of MME is the S1-MME interface specified in the third generation partnership project (3GPP).

As one example, an interface between the function of eNB and the function of S1-GW is the S1-U interface specified in 3GPP.

As one example, an interface between the function of MME and the function of S-GW is the S11 interface specified in 3GPP.

Example of Control

As one example, the control unit 163 sets the operation mode of the wireless communication device 100 to the second mode for allowing it to operate as a base station and a CN node, as a control for causing the wireless communication device 100 to perform the CN node operation. The setting of the operation mode may include switching of programs and switching of modules having program. Thus, as one example, in the wireless communication device 100, a program for the CN node operation is executed, and the wireless communication device 100 performs the CN node operation. The program may be stored previously in the wireless communication device 100 or may be provided as appropriate by the base station 20 or the CN node.

The control unit 163 may perform other processes, as a control for causing the wireless communication device 100 to perform the CN node operation, in addition to the setting of the operation mode or in place of the setting of the operation mode.

As one example, the control unit 163 may perform a process for the CN node operation. As one example, the control unit 163 may perform a process of the attach procedure (e.g. identification of a mobile station, authentication of a mobile station, and/or notification of attach complete to a mobile station) and a process of the procedure for bearer establishment (e.g. bearer context activation request and/or provision of bearer-related information).

As described above, the control unit 163 controls the operation of the wireless communication device 100 so that the wireless communication device 100 may perform the base station operation and the CN node operation. This makes it possible, as one example, to reduce the amount of wireless resources necessary for the wireless backhaul for the wireless communication device 100 operating as a base station. The delay of bearer establishment due to the wireless backhaul can be prevented.

(b) Wireless Backhaul

The base station operation and/or the CN node operation includes communicating with a core network node via the wireless backhaul between a corresponding base station and the wireless communication device 100.

This makes it possible, as one example, for a mobile station to be connected to the core network 10 and an external network, which is similar to the case where it performs wireless communication with a normal base station (e.g. the base station 20) even when the mobile station performs wireless communication with the wireless communication device 100 operating as a base station and a CN node.

(b-1) Corresponding Base Station

First Example

As a first example, the corresponding base station is a base station of a cell in which the wireless communication device 100 is located. As one example, the corresponding base station is the base station 20.

Second Example

As a second example, the corresponding base station may be a base station selected for the wireless communication device 100. The corresponding base station may be selected by a core network node (e.g. the control entity 11) or the base station 20, or may be selected by the wireless communication device 100. The corresponding base station may be selected based on a result obtained from measurement by the wireless communication device 100.

As the corresponding base station, a base station that is connected to a wired backhaul may be selected. When the base station connected to the wired backhaul fails to be selected, the control unit 163 may control the operation of the wireless communication device 100 so that the wireless communication device 100 may be prevented from performing the base station operation and the CN node operation. As one example, the control unit 163 may prevent the operation mode of the wireless communication device 100 being set to the second mode (mode for allowing the operation as a base station and the CN node to be performed). Different types of identification information may be allocated to the base station that is connected to the wired backhaul and the base station that is not connected to the wired backhaul, or the corresponding base station may be selected based on the identification information allocated to the base station.

Notification

As one example, the corresponding base station is notified to the wireless communication device 100 by the base station 20 or a core network node (e.g. the control entity 11). The control unit 163 controls the operation of the wireless communication device 100 so that it may perform wireless communication with the corresponding base station for the wireless backhaul.

As one example, a base station (e.g. the base station 20) or a core network transmits information indicating the corresponding base station (e.g. cell ID) to the wireless communication device 100, and the information acquisition unit 161 acquires the information. The control unit 163 performs a procedure for connection with the corresponding base station. This allows the wireless communication device 100 to use the wireless backhaul between the wireless communication device 100 and the corresponding base station. The control unit 163 may measure the quality of communication between the wireless communication device 100 and the corresponding base station based on the acquired information, and if the communication quality is equal to or more than a threshold, then the control unit 163 may execute a process for setting the wireless backhaul. The threshold may be transmitted to the wireless communication device 100 in conjunction with the information. The control unit 163 may send a message indicating the completion of the wireless backhaul setting process or a message indicating the rejection of the operation as a base station to the core network node as a response.

(b-2) Frequency Band to be Used

First Example

As a first example, the wireless backhaul include a wireless backhaul of another frequency band different from the frequency band that is used for the wireless communication between a base station and a mobile station (i.e., frequency band for radio access network (RAN)). As one example, the other frequency band is a frequency band of the millimeter wave band. As another example, the other frequency band may be a frequency band that is shared among a plurality of wireless communication systems and is permitted to be used. As one example, each of the frequency band and the other frequency band is a component carrier (CC). In this regard, more detailed description will be given with reference to FIG. 5.

Figure 5:
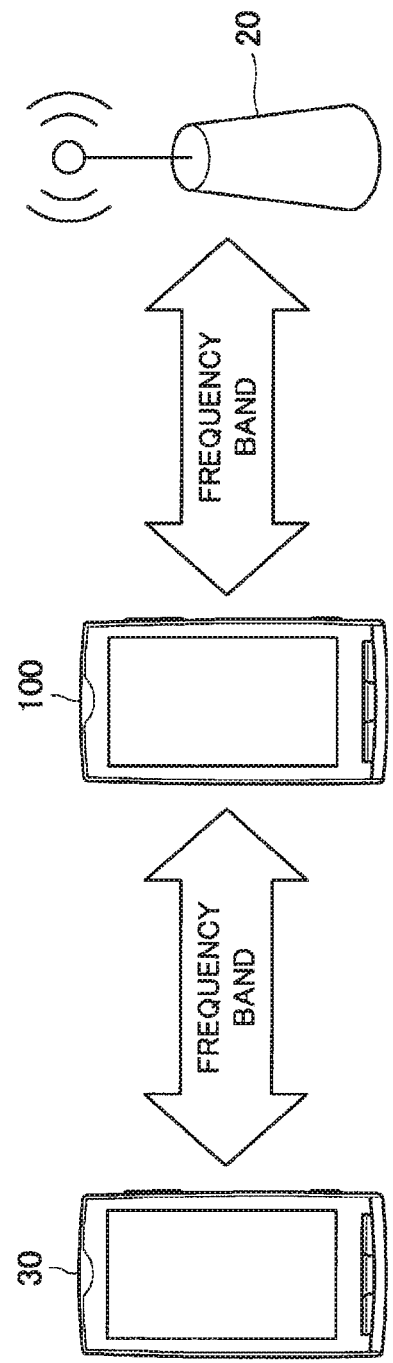
FIG. 5 is a diagram illustrated to describe an exemplary frequency band used for a wireless backhaul.

FIG. 5 is a diagram illustrated to describe an exemplary frequency band used for the wireless backhaul. Referring to FIG. 5, the base station 20, the mobile station 30, and the wireless communication device 100 are illustrated. The wireless communication device 100, when operating as a base station, uses a frequency band for RAN to perform wireless communication with the mobile station 30. On the other hand, the wireless communication device 100 uses not the frequency band for RAN but another frequency band (e.g. millimeter wave frequency band) for the sake of the wireless backhaul between the base station 20 and the wireless communication device 100.

The use of such other frequency band makes it possible, as one example, to reduce the load on the RAN traffic. As one example, the interference to the wireless communication between a base station and a mobile station can be prevented.

Second Example

As a second example, the wireless backhaul may include a wireless backhaul of the frequency band used for the wireless communication between a base station and a mobile station.

Referring again to FIG. 5, as described above, as one example, the wireless communication device 100, when performing the base station operation, uses the frequency band for RAN to perform the wireless communication with the mobile station 30. On the other hand, the wireless communication device 100 may use the frequency band for RAN, for the sake of the wireless communication between the base station 20 and the wireless communication device 100. In this case, the frequency band for RAN used for the wireless communication with a mobile station and the frequency band for RAN used for the wireless backhaul may be different frequency bands (e.g. difference CCs).

The use of such a frequency band makes it possible to be connected to the core network 10 and an external network, as one example, even when another frequency band fails to be used.

Notification

As one example, the wireless backhaul is a wireless backhaul of the frequency band that is notified to the wireless communication device 100 by a base station (e.g. the base station 20) or a core network node (e.g. the control entity 11). In this case, the control unit 163 controls the operation of the wireless communication device 100 so that the wireless communication device 100 may perform wireless communication with the corresponding base station using the frequency band notified to the wireless communication device 100.

As one example, a base station (e.g. the base station 20) or a core network transmits information indicating the frequency band to the wireless communication device 100, and the information acquisition unit 161 acquires the information. Then, the control unit 163 sets the frequency band to the frequency band for the wireless backhaul. This allows the second wireless communication unit 140 to use the frequency band, as one example.

This makes it possible, as one example, for a network to specify a frequency band for the wireless backhaul. Thus, the interference can be avoided or prevented, as one example.

The control unit 163 may control the operation of the wireless communication device 100 so that the wireless communication device 100 may perform wireless communication with the corresponding base station using a portion of the frequency band notified to the wireless communication device 100 and the wireless communication device 100 may perform wireless communication with a mobile station using another portion of the frequency band. In other words, a portion of the frequency band notified to the wireless communication device 100 may be used for the wireless backhaul, and another portion of the frequency band may be used for the wireless communication between the wireless communication device 100 and a mobile station. This makes it possible to use efficiently wireless resources. The other portion of the frequency band may be used as the secondary component carrier for a mobile station.

(b-3) Communication Scheme

As one example, the communication scheme for the wireless backhaul is the same as the communication scheme for the wireless backhaul between a base station and a mobile station (i.e., RAN communication scheme). More specifically, as one example, the communication scheme is the evolved universal terrestrial radio access network (EUTRAN) communication scheme in LTE, LTE-Advance, or its equivalent communication standard.

The communication scheme for the wireless backhaul may be another communication scheme that is different from the communication scheme for the wireless backhaul between a base station and a mobile station.

(b-4) Connection with Corresponding Base Station

As one example, the wireless communication device 100 establishes a connection with the corresponding base station. As one example, the control unit 163 performs a process for establishing the connection (e.g. synchronization, acquisition of system information, random access procedure, etc.).

(b-5) Connection with CN Node

As one example, the wireless communication device 100 establishes the connection with the CN node and then initiates the base station operation and the CN node operation. As one example, the control unit 163 performs a process for establishing the connection.

As one example, the wireless communication device 100 establishes a connection with the second gateway 17 (e.g. P-GW). In this case, as one example, the interface between the wireless communication device 100 and the P-GW is the S5 interface or the S8 interface specified in 3GPP.

As one example, the wireless communication device 100 establishes a connection with the subscriber information database 13 (e.g. HSS). In this case, as one example, the interface between the wireless communication device 100 and the HSS is the S6a interface specified in 3GPP. As one example, the wireless communication device 100 acquires information stored by the subscriber information database 13 to perform the operation (e.g. authentication, etc.) as the control entity (e.g. MME). The wireless communication device 100 may store at least a portion of all the information stored by the subscriber information database 13. The wireless communication device 100 may perform the operation (e.g. authentication, etc.) as the control entity (e.g. MME) based on the at least a portion. The wireless communication device 100 may delete the at least a portion stored by the wireless communication device 100 when the CN node operation is terminated. Alternatively, the wireless communication device 100 may encrypt the at least a portion stored by the wireless communication device 100 and may continue to store it. This allows the information to be reused when the CN node operation is performed again. The encryption scheme may be indicated by the subscriber information database 13.

The wireless communication device 100 may establish a connection with another core network node. As one example, the wireless communication device 100 may establish a connection with a database that stores identification information of equipment (e.g. EIR). The interface between the wireless communication device 100 and the EIR may be the S13 interface specified in 3GPP.

The wireless communication device 100 that performs the base station operation and the CN node operation may be connected to any home public land mobile network (HPLMN) in a roaming scenario as the visited public land mobile network (VPLMN). As one example, as shown in "Figure 4.2.1-2: Roaming Architecture for 3GPP Accesses, home routed traffic" of "3rd Generation Partnership Project; Technical Specification Group Services and System Aspects; Telecommunication management; Study on Charging Management; 3GPP Evolved Packet Core (EPC): Charging aspects (Release 8)", the wireless communication device 100 may be connected to the HPLMN as the VPLMN.

When the CN node operation does not include an operation as a gateway that is responsible for the user plane functionality, the wireless communication device 100 may establish a connection with the gateway (e.g. the first gateway 15) and then initiates the base station operation and the CN node operation. The gateway may be the S-GW, and in this case, the interface between the wireless communication device 100 and the gateway (i.e., S-GW) may be the S1-U interface specified in 3GPP. The gateway may be the MBMS-GW, and in this case, the interface between the wireless communication device 100 and the gateway (i.e., MBMS-GW) may be the M1 interface specified in 3GPP. The wireless communication device 100 may establish a connection with another wireless communication device 100 that performs the CN node operation including an operation as the gateway responsible for the user plane functionality.

When the CN node operation does not include the operation as the control entity that is responsible for the control plane functionality, the wireless communication device 100 may establish a connection with the control entity (e.g. the control entity 11) and then initiates the base station operation and the CN node operation. The control entity may be the MME, and in this case, the interface between the wireless communication device 100 and the control entity (i.e., MME) may be the S1-MME interface specified in 3GPP. The control entity may be the multi-cell/multicast coordination entity (MCE), and in this case, the interface between the wireless communication device 100 and the control entity (i.e., MCE) may be the M2 interface specified in 3GPP. The wireless communication device 100 may establish a connection with another wireless communication device 100 that performs the CN node operation including an operation as the control entity responsible for the control plane functionality.

(c) Trigger of Operation

Execution of Base Station Operation and CN Node Operation

As one example, the control unit 163 controls the operation of the wireless communication device 100 so that the wireless communication device 100 may perform the base station operation and the CN node operation, upon request from the base station 20 or the CN node.

More specifically, as one example, the base station 20 or the CN node transmits control information for requesting the execution of the base station operation and the CN node operation to the wireless communication device 100, and the information acquisition unit 161 acquires the control information. Then, the control unit 163 sets the operation mode of the wireless communication device 100 to the second mode for allowing it to operate as a base station and a CN node.

This makes it possible, as one example, for the wireless communication device 100 to operate as a base station and a CN node on demand of the network side. As one example, when the amount of traffic increases, the wireless communication device 100 can operate as a base station and a CN node. It is possible to provide the MBMS in a particular area by causing a wireless communication device 100 that is located in the particular area to operate as a base station and a CN node that supports the MBMS on demand of the wireless communication device side or the network side. This makes it possible to provide efficiently the MBMS in an area that is smaller than the macro cell.

Termination of Base Station Operation and CN Node Operation

As one example, the control unit 163 controls the operation of the wireless communication device 100 so that the wireless communication device 100 may terminate the base station operation and the CN node operation, upon request from the base station 20 or the CN node.

More specifically, as one example, the base station 20 or the CN node transmits control information for requesting the termination of the base station operation and the CN node operation to the wireless communication device 100, and the information acquisition unit 161 acquires the control information. Then, the control unit 163 sets the operation mode of the wireless communication device 100 to the first mode for allowing it to operate as a mobile station. The control unit 163, when setting the operation mode of the wireless communication device 100 to the first mode (i.e., a mode for allowing it to operate as a mobile station), may control a handover of the mobile station 30 connected to the wireless communication device 100 that is performing the base station operation. The handover is a handover from the wireless communication device 100 that is performing the base station operation to another base station (e.g. the base station 20). Then, the control unit 163 may set the operation mode of the wireless communication device 100 to the first mode after completion of the handover.

(d) Connection of Mobile Station to Wireless Communication Device Performing Base Station Operation The control unit 163, when controlling the wireless communication device 100 so that the wireless communication device 100 may perform the base station operation and the CN node operation, may perform a control for causing a mobile station to be connected to the wireless communication device 100.

(d-1) Change of Parameter Relating to Measurement

The control unit 163 may request a base station (e.g. the base station 20) located near the wireless communication device 100 or a control entity (e.g. the control entity 11) corresponding to the base station to change the parameter relating to measurement notified from the base station located near the wireless communication device 100 to a mobile station, as the control described above.

The parameter may include a threshold and/or offset for an event of measurement report. The parameter may include a variable relating to S-criterion for cell selection/cell-reselection. The parameter may include the transmission power of the reference signal.

The control unit 163 may provide the base station or the control entity with information relating to the base station operation of the wireless communication device 100 instead of requesting the base station or the control entity to change the parameter. The information may indicate a frequency band used by the wireless communication device 100 and/or the maximum transmission power of the wireless communication device 100 with respect to the frequency band. The base station or the control entity may change the parameter as necessary based on the information.

(d-2) Addition to Neighbor Cell List

The control unit 163 may request a base station (e.g. the base station 20) located near the wireless communication device 100 or a control entity (e.g. the control entity 11) corresponding to the base station to change a neighbor cell list that is notified from the base station located near the wireless communication device 100 to a mobile station, as the control described above.

More specifically, as one example, the control unit 163 may request the base station or the control entity to add a cell of the wireless communication device 100 performing a base station operation to the neighbor cell list.

The control unit 163 may provide the base station or the control entity with identification information of a cell (e.g. cell ID) of the wireless communication device 100, instead of requesting the base station or the control entity to change the neighbor cell list. The base station or the control entity may change the neighbor cell list as necessary based on the identification information. The base station or the control entity may store another proximity cell list (second proximity cell list) that is different from the neighbor cell list (first proximity cell list), instead of adding a cell of the wireless communication device 100 to the neighbor cell list upon request from the control unit 163. Furthermore, the priority of cell selection/cell reselection may be set for the first proximity cell list and the second proximity cell list.

3. Processing Procedure

Figure 6:
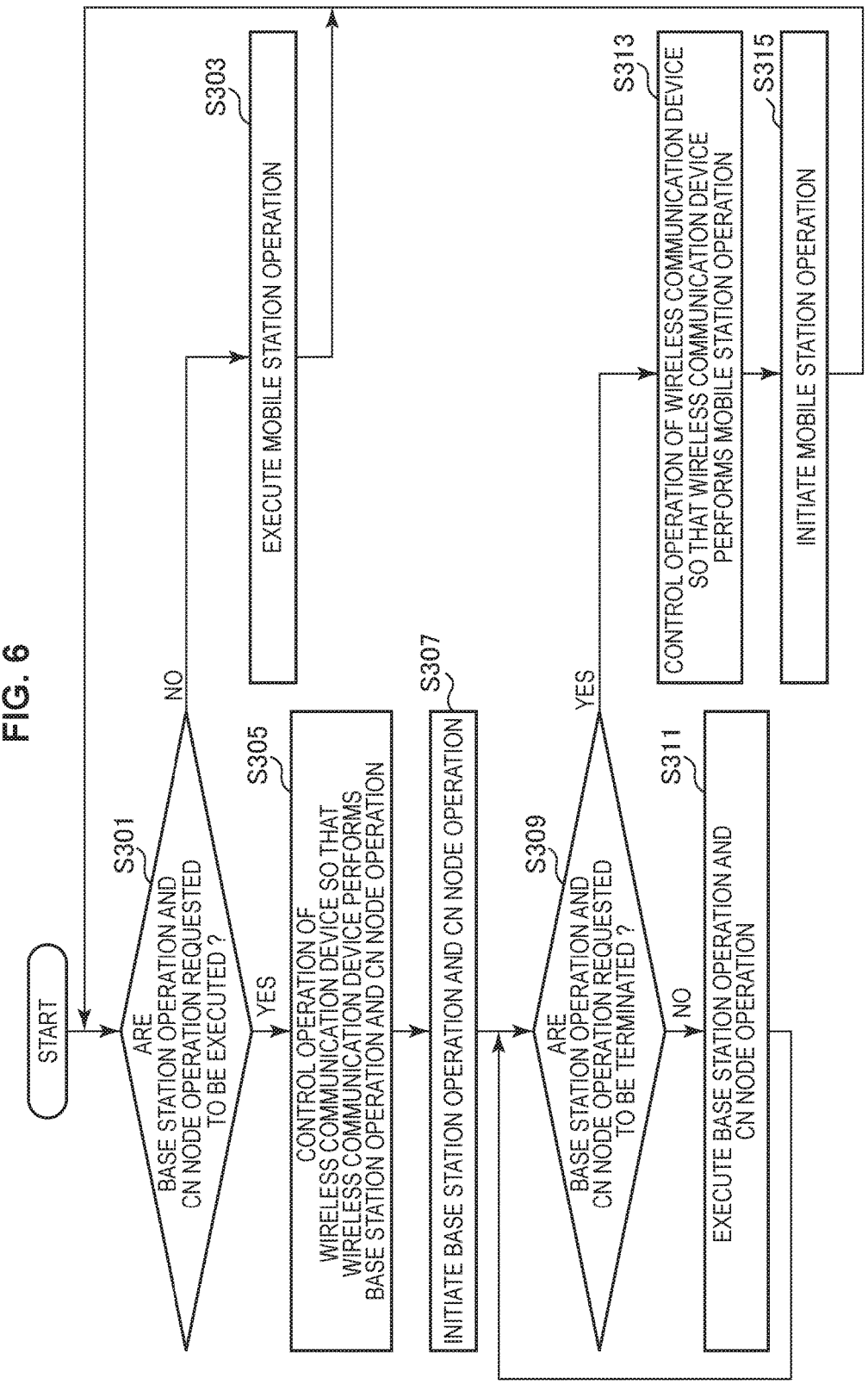
FIG. 6 is a flowchart illustrating schematically an exemplary procedure of a process according to the present embodiment.

An exemplary process according to one embodiment of the present disclosure is now described with reference to FIG. 6. FIG. 6 is a flowchart illustrating schematically an exemplary procedure of a process according to one embodiment of the present disclosure. In this example, the wireless communication device 100 performs a mobile station operation (i.e., operation as a mobile station) at the time when the process is started.

The control unit 163 determines whether a base station operation (i.e., operation as a base station) and a CN node operation (i.e., operation as a CN node) are requested to be executed (S301).

If the base station operation and the CN node operation are not requested to be executed (NO in S301), the wireless communication device 100 continues to perform a mobile station operation (S303). Then, the process returns to step S301.

If the base station operation and the CN node operation are requested to be executed (Yes in S301), the control unit 163 controls the operation of the wireless communication device 100 so that the wireless communication device 100 may perform the base station operation and the CN node operation (S305). As one example, the control unit 163 sets the operation mode of the wireless communication device 100 to a second mode for allowing it to operate as a base station and a CN node, as a control for causing the wireless communication device 100 to perform the base station operation and the CN node operation. Then, the wireless communication device 100 initiates the base station operation and the CN node operation (S307).

The control unit 163 determines whether the base station operation and the CN node operation are requested to be terminated (S309).

If the base station operation and the CN node operation are not requested to be terminated (No in S309), the wireless communication device 100 continues to perform the base station operation and the CN node operation (S311). Then, the process returns to step S309.

If the base station operation and the CN node operation are requested to be terminated (Yes in S309), the control unit 163 controls the operation of the wireless communication device 100 so that the wireless communication device 100 may terminate the base station operation and the CN node operation and perform the mobile station operation (S313). As one example, the control unit 163 sets the operation mode of the wireless communication device 100 to the first mode for allowing it to operate as a mobile station, as a control for causing the wireless communication device 100 to terminate the base station operation and the CN node operation. Then, the wireless communication device 100 initiates the mobile station operation (S315). Then, the process returns to step S301.

4. Application Examples

The technology according to the present disclosure is applicable to a variety of products. For example, a wireless communication device 100 may be implemented as a mobile terminal such as smartphone, tablet personal computer (PC), notebook PC, portable game console, portable/dongle type mobile router, and digital camera, or an in-vehicle terminal such as car navigation device. The wireless communication device 100 may also be implemented as a terminal (that is also referred to as a machine type communication (MTC) terminal) that performs machine-to-machine (M2M) communication. Furthermore, at least a part of components of the wireless communication device 100 may be implemented in a module (e.g. an integrated circuit module including a single die) mounted on each of these terminals.

First Application Example

Figure 7:
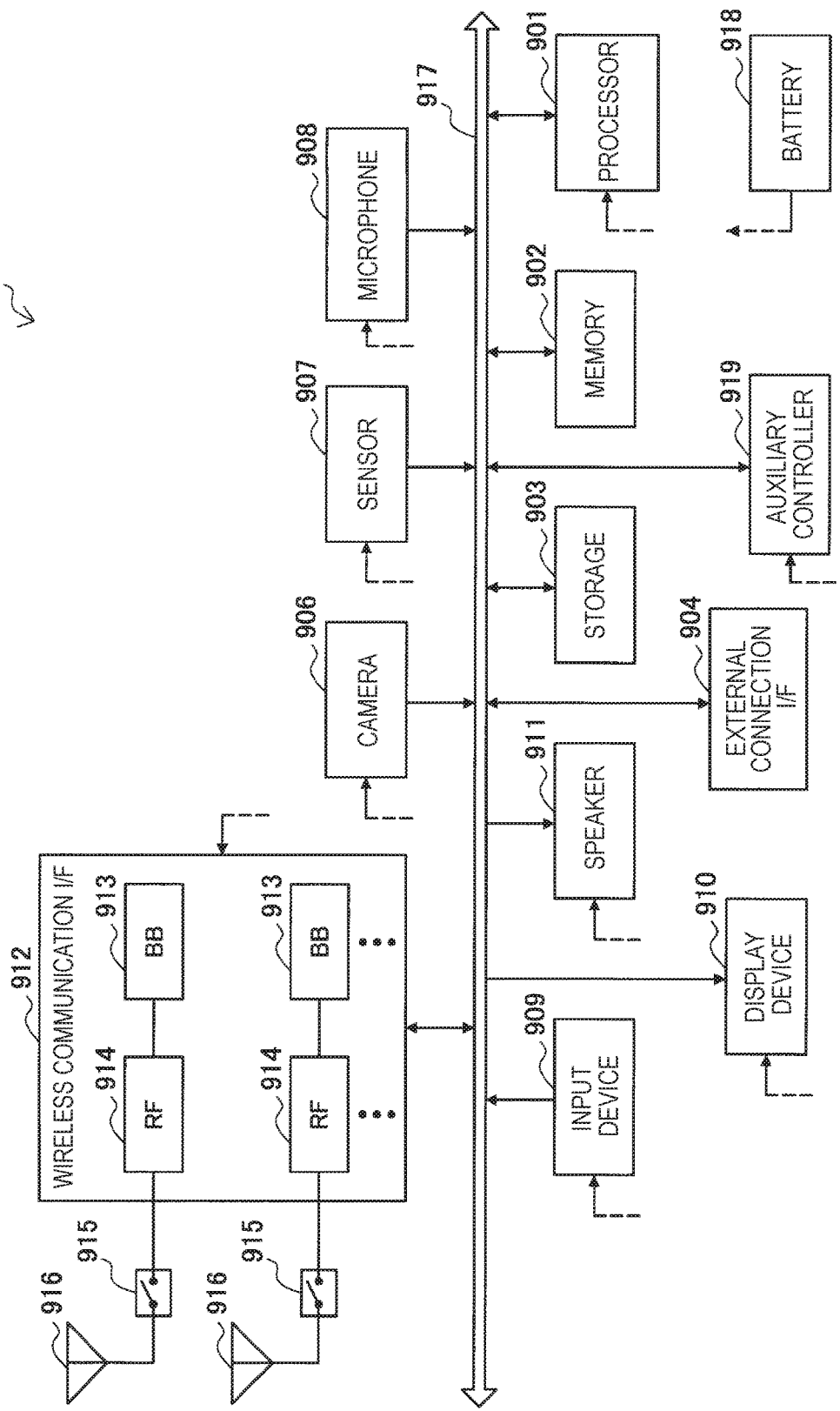
FIG. 7 is a block diagram illustrating schematically an exemplary configuration of a smartphone.

FIG. 7 is a block diagram illustrating an example of a schematic configuration of a smartphone 900 to which the technology according to the present disclosure may be applied. The smartphone 900 is configured to include a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program and data to be executed by the processor 901. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sound that is input to the smartphone 900 to audio signals. The input device 909 includes, for example, a touch sensor configured to detect a touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sound.

The wireless communication interface 912 supports any cellular communication scheme such as LTE and LTE-Advanced, and performs wireless communication. The wireless communication interface 912 may typically include, for example, a BB processor 913 and an RF circuit 914. The BB processor 913 may perform, for example, encoding/decoding, modulating/demodulating, and multiplexing/de-multiplexing, and executes various types of signal processing for wireless communication. Meanwhile, the RF circuit 914 may include, for example, a mixer, a filter, and an amplifier, and transmits and receives a wireless signal via the antenna 916. The wireless communication interface 912 may also be a one-chip module that has the BB processor 913 and the RF circuit 914 integrated thereon. The wireless communication interface 912 may include a plurality of BB processors 913 and a plurality of RF circuits 914, as illustrated in FIG. 7. Although FIG. 7 illustrates the example in which the wireless communication interface 912 includes a plurality of BB processors 913 and a plurality of RF circuits 914, the wireless communication interface 912 may include a single BB processor 913 or a single RF circuit 914.

Furthermore, in addition to a cellular communication scheme, the wireless communication interface 912 may support another type of wireless communication scheme such as a short-distance wireless communication scheme, a near field communication scheme, and a radio local area network (LAN) scheme. In that case, the wireless communication interface 912 may include the BB processor 913 and the RF circuit 914 for each wireless communication scheme.

Each of the antenna switches 915 switches connection destinations of the antennas 916 among a plurality of circuits (e.g. circuits for different wireless communication schemes) included in the wireless communication interface 912.

Each of the antennas 916 includes a single or a plurality of antenna elements (e.g. a plurality of antenna elements that constitute an MIMO antenna), and is used to allow the wireless communication interface 912 to transmit and receive a wireless signal. The smartphone 900 may include a plurality of antennas 916, as illustrated in FIG. 7. Although FIG. 7 illustrates the example in which the smartphone 900 includes a plurality of antennas 916, the smartphone 900 may include a single antenna 916.

Furthermore, the smartphone 900 may be provided with the antenna 916 for each wireless communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies power to blocks of the smartphone 900 illustrated in FIG. 7 via feeder lines, which are partially shown as dashed lines in the figure. The auxiliary controller 919 operates a minimum necessary function of the smartphone 900, for example, in a sleep mode.

In the smartphone 900 illustrated in FIG. 7, the information acquisition unit 161 and/or the control unit 163 described above with reference to FIG. 2 may be equipped in the wireless communication interface 912. Alternatively, at least some of the components may be equipped in the processor 901 or the secondary controller 919. As one example, the smartphone 900 may be equipped with a module including some (e.g. the BB processor 913) or all components of the wireless communication interface 912, the processor 901, and/or the secondary controller 919, and the information acquisition unit 161 and/or the control unit 163 may be equipped in the module. In this case, the module may store a program for causing the processor to function as the information acquisition unit 161 and/or the control unit 163 (that is, a program for causing the processor to execute the operation of the information acquisition unit 161 and/or the control unit 163) and execute the program. As another example, the program for causing the processor to function as the information acquisition unit 161 and/or the control unit 163 may be installed in the smartphone 900, and the wireless communication interface 912 (e.g. the BB processor 913), the processor 901, and/or the secondary controller 919 may execute the program. As described above, the smartphone 900 or the module may be provided as a device including the information acquisition unit 161 and/or the control unit 163, and the program for causing the processor to function as the information acquisition unit 161 and/or the control unit 163 may be provided. A readable recording medium in which the program is recorded may be provided.

In the smartphone 900 illustrated in FIG. 7, as one example, the first wireless communication unit 120 and the second wireless communication unit 140 described above with reference to FIG. 2 may be equipped in the wireless communication interface 912 (e.g. the RF circuit 914). The first wireless communication unit 120 and the second wireless communication unit 140 may be equipped in the wireless communication interfaces 912 having different physical configurations or may be equipped in the wireless communication interface 912 having the same physical configuration. The first antenna unit 110 and the second antenna unit 130 may be equipped in the antenna 916. The first antenna unit 110 and the second antenna unit 130 may be equipped in the antennas 916 having different physical configurations or may be equipped in the antennas 916 having the same physical configuration.

Second Application Example

Figure 8:
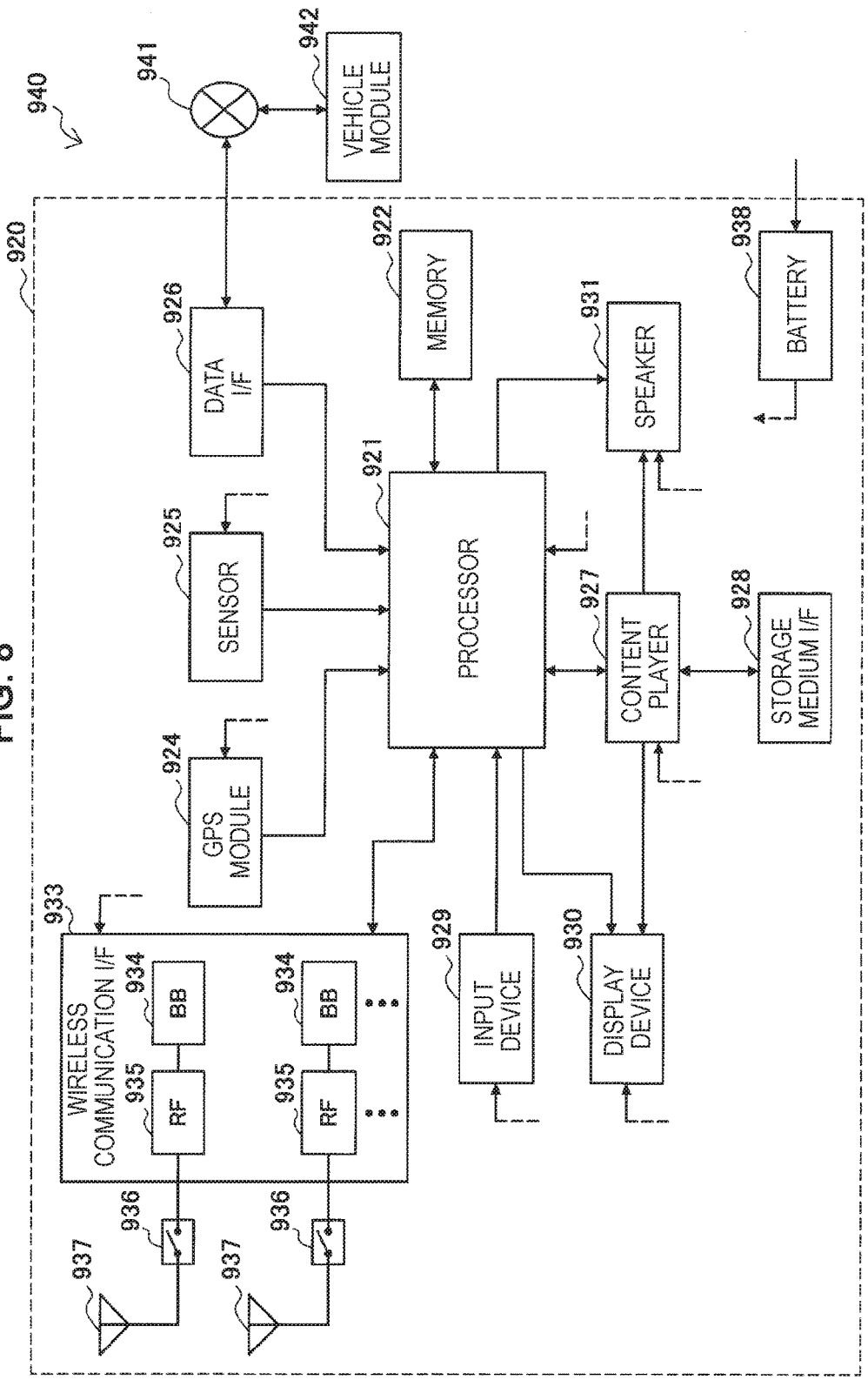
FIG. 8 is a block diagram illustrating schematically an exemplary configuration of a car navigation device.

FIG. 8 is a block diagram illustrating an example of a schematic configuration of a car navigation device 920 to which the technology according to the present disclosure may be applied. The car navigation device 920 is configured to include a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or a SoC, and controls a navigation function and another function of the car navigation device 920. The memory 922 includes RAM and ROM, and stores a program and data to be executed by the processor 921.

The GPS module 924 uses GPS signals received from a GPS satellite to measure a position (e.g. latitude, longitude, and altitude) of the car navigation device 920. The sensor 925 may include a group of sensors such as a gyro sensor, a geomagnetic sensor, and a barometric sensor. The data interface 926 is connected to, for example, an in-vehicle network 941 via a terminal that is not shown, and acquires data generated by the vehicle, such as vehicle speed data.

The content player 927 reproduces content stored in a storage medium (e.g. CD and DVD) that is inserted into the storage medium interface 928. The input device 929 includes, for example, a touch sensor configured to detect a touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs the navigation function or sound of the content that is reproduced.

The wireless communication interface 933 supports a cellular communication scheme such as LTE or LTE-Advanced, and performs wireless communication. The wireless communication interface 933 may typically include the BB processor 934, the RF circuit 935, and the like. The BB processor 934 may, for example, perform encoding/decoding, modulation/demodulation, multiplexing/de-multiplexing, and the like, and executes a variety of types of signal processing for wireless communication. Meanwhile, the RF circuit 935 may include a mixer, a filter, an amplifier, and the like, and transmits and receives a wireless signal via the antenna 937. The wireless communication interface 933 may also be a one-chip module including the BB processor 934 and the RF circuit 935 integrated thereon. The wireless communication interface 933 may include a plurality of BB processors 934 and a plurality of RF circuits 935 as illustrated in FIG. 8. FIG. 8 illustrates an example in which the wireless communication interface 933 includes a plurality of BB processors 934 and a plurality of RF circuits 935, but the wireless communication interface 933 may be a single BB processor 934 or a single RF circuit 935.

Furthermore, in addition to a cellular communication scheme, the wireless communication interface 933 may support another type of wireless communication scheme such as a short-distance wireless communication scheme, a near field communication scheme, and a wireless LAN scheme. In that case, the wireless communication interface 933 may include the BB processor 934 and the RF circuit 935 for each wireless communication scheme.

Each of the antenna switches 936 switches connection destinations of the antennas 937 among a plurality of circuits (e.g. circuits for different wireless communication schemes) included in the wireless communication interface 933.

Each of the antennas 937 includes a single or a plurality of antenna elements (e.g. a plurality of antenna elements that constitute an MIMO antenna), and is used to allow the wireless communication interface 933 to transmit and receive a wireless signals. The car navigation device 920 may include a plurality of antennas 937, as illustrated in FIG. 8. Although FIG. 8 illustrates the example in which the car navigation device 920 includes a plurality of antennas 937, the car navigation device 920 may include a single antenna 937.

Furthermore, the car navigation device 920 may include the antenna 937 for each wireless communication scheme. In that case, the antenna switches 936 may be omitted from the configuration of the car navigation device 920.

The battery 938 supplies power to blocks of the car navigation device 920 illustrated in FIG. 8 via feeder lines that are partially shown as dashed lines in the figure. The battery 938 accumulates power supplied form the vehicle.

In the car navigation device 920 illustrated in FIG. 8, the information acquisition unit 161 and/or the control unit 163 described above with reference to FIG. 2 may be equipped in the wireless communication interface 933. Alternatively, at least some of the components may be equipped in the processor 921. As one example, the car navigation device 920 may be equipped with a module including some or all components of the wireless communication interface 933 (e.g. the BB processor 934) and/or the processor 921, and the information acquisition unit 161 and/or the control unit 163 may be equipped in the module. In this case, the module may store a program for causing the processor to function as the information acquisition unit 161 and/or the control unit 163 (that is, a program for causing the processor to execute the operation of the information acquisition unit 161 and/or the control unit 163) and execute the program. As another example, the program for causing the processor to function as the information acquisition unit 161 and/or the control unit 163 may be installed in the car navigation device 920, and the wireless communication interface 933 (e.g. the BB processor 934) and/or the processor 921 may execute the program. As described above, the car navigation device 920 or the module may be provided as a device including the information acquisition unit 161 and/or the control unit 163, and the program for causing the processor to function as the information acquisition unit 161 and/or the control unit 163 may be provided. A readable recording medium in which the program is recorded may be provided.

In the car navigation device 920 illustrated in FIG. 8, as one example, the first wireless communication unit 120 and the second wireless communication unit 140 described above with reference to FIG. 2 may be equipped in the wireless communication interface 933 (e.g. the RF circuit 935). The first wireless communication unit 120 and the second wireless communication unit 140 may be equipped in the wireless communication interfaces 933 having different physical configurations or may be equipped in the wireless communication interface 933 having the same physical configuration. The first antenna unit 110 and the second antenna unit 130 may be equipped in the antenna 937. The first antenna unit 110 and the second antenna unit 130 may be equipped in the antennas 937 having different physical configurations or may be equipped in the antennas 937 having the same physical configuration.

The technology according to the present disclosure may also be implemented as an in-vehicle system (or a vehicle) 940 including one or more blocks of the car navigation device 920, the in-vehicle network 941, and a vehicle module 942. That is, the in-vehicle system (or a vehicle) 940 may be provided as a device including the information acquisition unit 161 and/or the control unit 163. The vehicle module 942 generates vehicle-related data such as vehicle speed, engine RPM, and trouble information, and outputs the generated data to the in-vehicle network 941.

5. Conclusion

The apparatus and processing according to an embodiment of the present disclosure has been described with reference to FIGS. 1 to 8. According to the embodiments according to the present disclosure, the wireless communication device 100 is provided with the control unit 163 for controlling the operation of the wireless communication device 100 so that the wireless communication device 100 may perform an operation as a mobile station that performs wireless communication with a base station. The control unit 163 controls the operation of the wireless communication device 100 so that the wireless communication device 100 may perform operations as a base station performing wireless communication with a mobile station and a core network node.

This makes it possible to reduce the amount of wireless resources necessary for a wireless backhaul for the wireless communication device 100 operating as a base station.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Although there has been mainly the example in which the operation mode of the wireless communication device 100 is set to one of the first mode (mode for operating as a mobile station) and the second mode (mode for operating as a base station and a CN node), the present disclosure is not limited thereto. As one example, the wireless communication device 100 may perform the operation as a base station and the operation as a CN node while performing the operation as a mobile station.

Although an example in which the communication system is a system based on LTE, LTE-Advance, or its equivalent communication standard has been described, the present disclosure is not limited to such an example. For example, the communication system may be a system based on other communication standards.

Also, the processing steps in each process in this specification are not strictly limited to execution in a time series following the sequence described in a flowchart or a sequence diagram. For example, the processing steps in each process may be executed in a sequence that differs from a sequence described herein as a flowchart or a sequence diagram, and furthermore may be executed in parallel.

Further, it is also possible to create a computer program (in other words, a computer program for causing the processor to execute an operation of the components of the above-described apparatus) for allowing a processor (e.g. CPU and DSP, etc.) provided in the apparatus (e.g. the wireless communication device or the module thereof) in the present specification to function as the components (e.g. the information acquisition unit and/or the control unit) of the above-described apparatus. Further, it is also possible to provide a recording medium having the above-described computer program recorded therein. Further, it is also possible to provide an apparatus (e.g. a finished product and a module (parts, processing circuits and chips, etc.) for the finished product) including a memory having the above-described computer program stored therein and one or more processors which can execute the above-described computer program. Further, a method including the operation of the components (e.g. an information acquisition unit and/or the control unit) of the above-described apparatus is included in the technology according to the present disclosure.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)

An apparatus including:

a controller configured to control an operation of a wireless communication device so that the wireless communication device performs an operation as a mobile station performing wireless communication with a base station, wherein the controller controls an operation of the wireless communication device so that the wireless communication device performs an operation as a base station performing wireless communication with a mobile station and an operation as a core network node.

(2)

The apparatus according to (1), wherein the core network node includes a control entity responsible for control plane functionality.

(3)

The apparatus according to (2), wherein the control entity is a mobility management entity.

(4)

The apparatus according to (2) or (3), wherein the operation as the core network node includes performing an attach procedure as the control entity or performing a procedure for bearer establishment as the control entity.

(5)

The apparatus according to any one of (1) to (4), wherein the core network node includes a gateway responsible for user plane functionality.

(6)

The apparatus according to (5), wherein the gateway is a serving gateway.

(7)

The apparatus according to (5) or (6), wherein the operation as the core network node includes performing a procedure for bearer establishment as the gateway and performing a control of packet transfer in accordance with a policy as the gateway.

(8)

The apparatus according to any one of (1) to (7), wherein the controller controls an operation of the wireless communication device so that the wireless communication device performs the operation as the base station and the operation as the core network node upon request from the base station or the core network node.

(9)

The apparatus according to any one of (1) to (8), wherein the operation as the base station or the operation as the core network node includes communicating with the core network node via a wireless backhaul between a corresponding base station and the wireless communication device.

(10)

The apparatus according to (9), wherein the wireless backhaul includes a wireless backhaul of another frequency band different from a frequency band used for wireless communication between a base station and a mobile station.

(11)

The apparatus according to (9) or (10), wherein the wireless backhaul includes a wireless backhaul of a frequency band used for wireless communication between a base station and a mobile station.

(12)

The apparatus according to any one of (9) to (11), wherein the wireless backhaul is a wireless backhaul of a frequency band notified to the wireless communication device by a base station or a core network node, and the controller controls an operation of the wireless communication device so that the wireless communication device performs wireless communication with the corresponding base station using the frequency band notified to the wireless communication device.

(13)

The apparatus according to (12), wherein the controller controls an operation of the wireless communication device so that the wireless communication device performs wireless communication with the corresponding base station using a portion of the frequency band and the wireless communication device performs wireless communication with a mobile station using another portion of the frequency band.

(14)

The apparatus according to any one of (1) to (13), wherein the operation as the base station includes transmitting a control signal of a downlink, wherein the control signal includes a synchronization signal and a reference signal.

(15)

The apparatus according to any one of (1) to (14), wherein the operation as the mobile station includes, in frequency division duplex (FDD), receiving a downlink signal using a downlink band and transmitting an uplink signal using an uplink band, and the operation as the base station includes, in FDD, transmitting a downlink signal using the downlink band and receiving an uplink signal using the uplink band.

(16)

The apparatus according to any one of (1) to (14), wherein the operation as the mobile station includes, in time division duplex (TDD), receiving a downlink signal in a downlink sub-frame and transmitting an uplink signal in an uplink sub-frame, and the operation as the base station includes, in TDD, transmitting a downlink signal in a downlink sub-frame and receiving an uplink signal in an uplink sub-frame.

(17)

The apparatus according to any one of (1) to (14), wherein the operation as the mobile station includes, in FDD, receiving a downlink signal using a downlink band and transmitting an uplink signal using an uplink band, and the operation as the base station includes, in TDD, transmitting a downlink signal in a downlink sub-frame and receiving an uplink signal in an uplink sub-frame, using the downlink band or the uplink band.

(18)

The apparatus according to (17), wherein the operation as the base station includes, in TDD, transmitting a downlink signal in a downlink sub-frame and receiving an uplink signal in an uplink sub-frame, using both the downlink band and the uplink band through carrier aggregation.

(19)

A method including:

controlling, by a processor, an operation of a wireless communication device so that the wireless communication device performs an operation as a mobile station performing wireless communication with a base station; and controlling, by the processor, an operation of the wireless communication device so that the wireless communication device performs an operation as a base station performing wireless communication with a mobile station and an operation as a core network node.

(20)

A program for causing a processor to execute:

controlling an operation of a wireless communication device so that the wireless communication device performs an operation as a mobile station performing wireless communication with a base station; and controlling an operation of the wireless communication device so that the wireless communication device performs an operation as a base station performing wireless communication with a mobile station and an operation as a core network node.

(21)

A readable recording medium having a program recorded thereon, the program causing a processor to execute:

controlling an operation of a wireless communication device so that the wireless communication device performs an operation as a mobile station performing wireless communication with a base station; and controlling an operation of the wireless communication device so that the wireless communication device performs an operation as a base station performing wireless communication with a mobile station and an operation as a core network node.

(22)

The apparatus according to any one of (1) to (18), wherein the apparatus is the wireless communication device, or a module for the wireless communication device.

REFERENCE SIGNS LIST 1 communication system
10 core network
11 control entity
13 subscriber information database
15 first gateway
17 second gateway
20 base station
30 mobile station
100 wireless communication device
163 control unit

The invention claimed is:

1. An apparatus comprising:
a storage unit;
a processing unit including processing circuitry configured to control an operation of a wireless communication device so that the wireless communication device performs an operation as a mobile station performing wireless communication with a base station,
wherein the controller controls an operation of the wireless communication device so that the wireless communication device performs an operation as a base station performing wireless communication with a mobile station and an operation as a core network node,
wherein the operation as the base station or the operation as the core network node includes communicating with the core network node via a wireless backhaul between a corresponding base station and the wireless communication device;
wherein the wireless backhaul is a wireless backhaul of a frequency band notified to the wireless communication device by a base station or a core network node; and
the controller controls an operation of the wireless communication device so that the wireless communication device performs wireless communication with the corresponding base station using the frequency band notified to the wireless communication device;
wherein the controller controls an operation of the wireless communication device so that the wireless communication device performs wireless communication with the corresponding base station using a portion of the frequency band and the wireless communication device performs wireless communication with a mobile station using another portion of the frequency band.

2. The apparatus according to claim 1, wherein the core network node includes a control entity responsible for control plane functionality.

3. The apparatus according to claim 2, wherein the control entity is a mobility management entity.

4. The apparatus according to claim 2, wherein the operation as the core network node includes performing an attach procedure as the control entity or performing a procedure for bearer establishment as the control entity.

5. The information processing device according to claim 1, wherein the core network node includes a gateway responsible for user plane functionality.

6. The apparatus according to claim 5, wherein the gateway is a serving gateway.

7. The apparatus according to claim 5, wherein the operation as the core network node includes performing a procedure for bearer establishment as the gateway and performing a control of packet transfer in accordance with a policy as the gateway.

8. The apparatus according to claim 1, wherein the controller controls an operation of the wireless communication device so that the wireless communication device performs the operation as the base station and the operation as the core network node upon request from the base station or the core network node.

9. The apparatus according to claim 8, wherein the wireless backhaul includes a wireless backhaul of another frequency band different from a frequency band used for wireless communication between a base station and a mobile station.

10. The apparatus according to claim 8, wherein the wireless backhaul includes a wireless backhaul of a frequency band used for wireless communication between a base station and a mobile station.

11. The apparatus according to claim 1, wherein the operation as the base station includes transmitting a control signal of a downlink, wherein the control signal includes a synchronization signal and a reference signal.

12. The apparatus according to claim 1, wherein the operation as the mobile station includes, in frequency division duplex (FDD), receiving a downlink signal using a downlink band and transmitting an uplink signal using an uplink band, and
the operation as the base station includes, in FDD, transmitting a downlink signal using the downlink band and receiving an uplink signal using the uplink band.

13. The apparatus according to claim 1, wherein the operation as the mobile station includes, in time division duplex (TDD), receiving a downlink signal in a downlink sub-frame and transmitting an uplink signal in an uplink sub-frame, and
the operation as the base station includes, in TDD, transmitting a downlink signal in a downlink sub-frame and receiving an uplink signal in an uplink sub-frame.

14. The apparatus according to claim 1, wherein the operation as the mobile station includes, in FDD, receiving a downlink signal using a downlink band and transmitting an uplink signal using an uplink band, and
the operation as the base station includes, in TDD, transmitting a downlink signal in a downlink sub-frame and receiving an uplink signal in an uplink sub-frame, using the downlink band or the uplink band.

15. The apparatus according to claim 14, wherein the operation as the base station includes, in TDD, transmitting a downlink signal in a downlink sub-frame and receiving an uplink signal in an uplink sub-frame, using both the downlink band and the uplink band through carrier aggregation.

16. A method comprising:
controlling, by a processor, an operation of a wireless communication device so that the wireless communication device performs an operation as a mobile station performing wireless communication with a base station; and
controlling, by the processor, an operation of the wireless communication device so that the wireless communication device performs an operation as a base station performing wireless communication with a mobile station and an operation as a core network node
wherein the operation as the base station or the operation as the core network node includes communicating with the core network node via a wireless backhaul between a corresponding base station and the wireless communication device;
wherein the wireless backhaul is a wireless backhaul of a frequency band notified to the wireless communication device by a base station or a core network node; and
controlling, by the processor, an operation of the wireless communication device so that the wireless communication device performs wireless communication with the corresponding base station using the frequency band notified to the wireless communication device; and
controlling, by the processor, an operation of the wireless communication device so that the wireless communication device performs wireless communication with the corresponding base station using a portion of the frequency band and the wireless communication device performs wireless communication with a mobile station using another portion of the frequency band.

17. A non-transitory computer-readable medium encoded with computer readable instructions that, when executed by processing circuitry, cause the processing circuitry to perform a method comprising:
controlling an operation of a wireless communication device so that the wireless communication device performs an operation as a mobile station performing wireless communication with a base station; and
controlling an operation of the wireless communication device so that the wireless communication device performs an operation as a base station performing wireless communication with a mobile station and an operation as a core network node;
wherein the operation as the base station or the operation as the core network node includes communicating with the core network node via a wireless backhaul between a corresponding base station and the wireless communication device;
wherein the wireless backhaul is a wireless backhaul of a frequency band notified to the wireless communication device by a base station or a core network node; and
controlling, by the processor, an operation of the wireless communication device so that the wireless communication device performs wireless communication with the corresponding base station using the frequency band notified to the wireless communication device; and
controlling, by the processor, an operation of the wireless communication device so that the wireless communication device performs wireless communication with the corresponding base station using a portion of the frequency band and the wireless communication device performs wireless communication with a mobile station using another portion of the frequency band.

* * * * *